United States Patent
Yoshikawa et al.

(10) Patent No.: US 11,822,049 B2
(45) Date of Patent: Nov. 21, 2023

(54) LIGHTNING THREAT INFORMATION-PROVIDING APPARATUS, LIGHTNING THREAT INFORMATION-PROVIDING METHOD, AND PROGRAM

(71) Applicant: JAPAN AEROSPACE EXPLORATION AGENCY, Tokyo (JP)

(72) Inventors: Eiichi Yoshikawa, Tokyo (JP); Tomoo Ushio, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 506 days.

(21) Appl. No.: 16/642,323

(22) PCT Filed: Aug. 9, 2018

(86) PCT No.: PCT/JP2018/029852
§ 371 (c)(1),
(2) Date: Feb. 26, 2020

(87) PCT Pub. No.: WO2019/049601
PCT Pub. Date: Mar. 14, 2019

(65) Prior Publication Data
US 2021/0072423 A1   Mar. 11, 2021

(30) Foreign Application Priority Data

Sep. 6, 2017   (JP) .................................. 2017-170844

(51) Int. Cl.
*G01W 1/16* (2006.01)
*G06N 20/00* (2019.01)
(Continued)

(52) U.S. Cl.
CPC ................ *G01W 1/16* (2013.01); *G01W 1/10* (2013.01); *G06N 20/00* (2019.01); *G08G 5/0021* (2013.01);
(Continued)

(58) Field of Classification Search
None
See application file for complete search history.

(56) References Cited

U.S. PATENT DOCUMENTS 6,405,134 B1   6/2002  Smith et al.
7,069,258 B1 *  6/2006  Bothwell ................ G01W 1/10
                                                                706/15
(Continued)

FOREIGN PATENT DOCUMENTS

JP     4-9792 A     1/1992
JP     7-151866 A   6/1995
(Continued)

OTHER PUBLICATIONS

International Search Report in international Application No. PCT/JP2018/029852, filed Aug. 9, 2018.
(Continued)

*Primary Examiner* — Brent A. Fairbanks
(74) *Attorney, Agent, or Firm* — Saliwanchik, Lloyd & Eisenschenk

(57) ABSTRACT

[Object] To provide a lightning threat information-providing apparatus, a lightning threat information-providing method, and a program that are capable of providing a user with accurate information regarding a lightning threat.
[Solving Means] A lightning threat information-providing apparatus 1 includes: an input unit 10 that inputs observation parameters 11 regarding weather observation data, prediction parameters 12 regarding weather prediction data, and case data 13 regarding a case that occurs in association with
(Continued)

lightning occurrence; an intermediate parameter calculation unit that calculates, on the basis of the input observation parameters 11 and prediction parameters 12, an intermediate parameter 27 which is a parameter regarding physical quantity associated with the lightning occurrence and cannot be directly obtained from the observation data or the prediction data; and an arithmetic control unit 20 that estimates a lightning threat on the basis of the observation parameters 11, the prediction parameters 12, the case data 13, and the intermediate parameter 27.

18 Claims, 4 Drawing Sheets

(51) Int. Cl.
  *G01W 1/10* (2006.01)
  *G08G 5/00* (2006.01)
(52) U.S. Cl.
  CPC ......... *G08G 5/0065* (2013.01); *G08G 5/0091* (2013.01)

(56) References Cited

U.S. PATENT DOCUMENTS

| | | | |
|---|---|---|---|
| 9,134,418 | B1 | 9/2015 | Kronfeld et al. |
| 9,223,020 | B1* | 12/2015 | Crosmer ................. G01S 7/003 |
| 2010/0245165 | A1* | 9/2010 | Kauffman ............. G01S 13/953 |
| | | | 342/26 B |
| 2016/0343093 | A1* | 11/2016 | Riland ................... G06Q 50/06 |
| 2018/0074189 | A1* | 3/2018 | Khatwa ................... G01W 1/00 |
| 2018/0218303 | A1* | 8/2018 | Cole ..................... G06F 40/216 |
| 2019/0049500 | A1* | 2/2019 | Subramania ....... G01R 29/0842 |

FOREIGN PATENT DOCUMENTS

| | | | |
|---|---|---|---|
| JP | 10-73670 A | | 3/1998 |
| JP | 2002-40162 A | | 2/2002 |
| JP | 2003-270357 A | | 9/2003 |
| JP | 2009-31104 A | | 2/2009 |
| JP | 2009-192311 A | | 8/2009 |
| JP | 2009-192312 A | | 8/2009 |
| JP | 2009192311 A | * | 8/2009 |
| JP | 2009192312 A | * | 8/2009 |
| JP | 2010-241412 A | | 10/2010 |

OTHER PUBLICATIONS

Fukiyama, N. et at, "Lightning Forecast Method by Using Meteorological Factors," *T. IEE Japan*, 1996, 116-B(4):461-468, with English abstract.

Sato, H. et al., "Online lightning prediction system,"*NTT Gijutu Journal*, Dec. 2007, 19(12):26-29, with partial English translation.

"Weather-Eye," *JAXA Special Publication*, Feb. 22, 2017, pp. 1-86, JAXA, with partial English translation.

BISHOP, C. M., "Pattern Recognltion and Machine Learning," *Information Science and Statistics*, 2006, pp. 1-758, Springer Science+ Business Media, LLC.

Office Action dated Feb. 22, 2021 in Japanese Application No. 2017-170844, along with its English translation.

Office Action dated Jul. 19, 2022 in Japanese Application No. 2021-150134.

Office Action dated Oct. 19, 2022 in Japanese Application No. 2021-150134.

* cited by examiner

LIGHTNING THREAT INFORMATION-PROVIDING APPARATUS, LIGHTNING THREAT INFORMATION-PROVIDING METHOD, AND PROGRAM

CROSS-REFERENCE TO RELATED APPLICATIONS

This application is the U.S. national stage application of International Patent Application No. PCT/JP2018/029852, filed Aug. 9, 2018, which claims the benefit under 35 U.S.C. § 119 of Japanese Application No. 2017-170844, filed Sep. 6, 2017, the disclosures of each of which are incorporated herein by reference in their entirety.

TECHNICAL FIELD

The present invention relates to a lightning threat information-providing apparatus, a lightning threat information-providing method, and a program that provides information regarding a lightning threat such as a danger of a lightning strike to an aircraft.

BACKGROUND ART

The aircraft flight is roughly classified into a cruising phase and a takeoff/landing phase. Discrete weather information assistance technologies are used for those phases, respectively. Information based on a LIDEN operated by the Japan Meteorological Agency is widely used for lightning weather information assistance during the cruising phase. Moreover, since cruising aircraft can easily take evasive action, the aircraft are not frequently struck by lightning during the cruising phase. On the other hand, 90% or more of the aircraft lightning strikes occurs during the takeoff/landing phase (see Non-Patent Literature 1).

Honeywell International, Inc. adds a threat detection function to an airborne radar. This threat detection function is capable of detecting various weather threats including the lightning. Note that it is considered that the function is not able to distinguish what kind of threats will occur.

This function detects a threat only on the basis of echo intensity that is an observation value of the airborne radar. Since it is known that lightning (natural lightning) occurs in a low correlation with the echo intensity, it is envisaged that this function does not greatly contribute to prevention of a lightning strike to an aircraft. Some of Japanese domestic airlines have applied and used airborne radars with this function. However, they are still verifying validities of this function (see Patent Literature 1).

The JASDF Komatsu Airbase is equipped with a system called lightning detection and warning system (LiDAS). The LiDAS is a system including a weather radar, a lightning location system, and electric-field mills. Officers watch their observation results and comprehensively judge the danger of a lightning strike to an aircraft. Some airlines have utilized them and these have proved to be effective.

It is evident by the LiDAS that the comprehensive use of various types of weather observation data related to lightning can provide information sufficiently correlated with the occurrence of aircraft lightning strikes. However, since a function of identifying a lightning weather condition is not provided as a system, and experts have to identify the lightning weather condition.

CITATION LIST

Patent Literature

Patent Literature 1: Japanese Patent Application Laid-open No. 2010-241412

Non-Patent Literature

Non-Patent Literature 1: Japan Aerospace Exploration Agency (JAXA), "WEATHER-Eye Vision, WEATHER-Eye consortium," 4.4, 22 Feb. 20, 2017

DISCLOSURE OF INVENTION

Technical Problem

It is an object of the present invention to provide a lightning threat information-providing apparatus, a lightning threat information-providing method, and a program that are capable of providing a user with accurate information regarding a lightning threat.

Solution to Problem

In order to accomplish the above-mentioned object, a lightning threat information-providing apparatus according to an embodiment of the present invention includes: an input unit that inputs an observation parameter regarding weather observation data, a prediction parameter regarding weather prediction data, and case data regarding a case that occurs in association with lightning occurrence; an intermediate parameter calculation unit that calculates, on the basis of the input observation parameter and the input prediction parameter, an intermediate parameter which is a parameter regarding physical quantity associated with the lightning occurrence and cannot be directly obtained from the observation data or the prediction data; and a lightning threat-estimating unit that estimates a lightning threat on the basis of the observation parameter, the prediction parameter, the case data, and the intermediate parameter.

In the present invention, a lightning threat is estimated on the basis of the intermediate parameter which is the parameter regarding the physical quantity associated with the lightning occurrence and cannot be directly obtained from the observation data or the prediction data as well as the observation parameter, the prediction parameter, and the case data. Accurate information regarding the lightning threat can be thus provided to a user.

In the lightning threat information-providing apparatus according to the embodiment of the present invention, the lightning threat-estimating unit may include a lightning weather condition-identifying unit that identifies a lightning weather condition at a predetermined resolution on the basis of the observation parameter, the prediction parameter, the case data, and the intermediate parameter.

In the lightning threat information-providing apparatus according to the embodiment of the present invention, the lightning threat-estimating unit may include a lightning risk-estimating unit that estimates a lightning risk including a loss related to quality, cost, and delivery (QCD) due to a lightning strike on the basis of the observation parameter, the prediction parameter, the case data, and the intermediate parameter.

The lightning threat information-providing apparatus according to the embodiment of the present invention may further include a database that accumulates the observation parameter, the prediction parameter, the intermediate parameter, and the case data in association with one another, in which the input unit may be configured to input the observation parameter and the prediction parameter acquired in real time or semi-real time, the intermediate parameter calculation unit may be configured to calculate the intermediate parameter on the basis of the observation parameter and the prediction parameter acquired in real time or semi-real time, and the lightning threat-estimating unit may be configured to estimate a lightning threat corresponding to the observation parameter, the prediction parameter, and the intermediate parameter on the basis of the observation parameter, the prediction parameter, the intermediate parameter, and the case data accumulated in the database, the observation parameter and the prediction parameter being acquired in real time or semi-real time.

In the lightning threat information-providing apparatus according to the embodiment of the present invention, a calculation procedure and a judgement criteria of condition identification in the lightning weather condition-identifying unit may be configured to be determined and updated by machine learning.

In the lightning threat information-providing apparatus according to the embodiment of the present invention, a calculation procedure and a judgement criteria of risk estimation in the lightning risk-estimating unit may be configured to be determined and updated by machine learning.

With this configuration, more accurate information regarding the lightning threat can be provided to the user.

A lightning threat information-providing method according to an embodiment of the present invention includes: inputting an observation parameter regarding weather observation data, a prediction parameter regarding weather prediction data, and case data regarding a case that occurs in association with lightning occurrence; calculating, on the basis of the input observation parameter and the input prediction parameter, an intermediate parameter which is a parameter regarding physical quantity associated with the lightning occurrence and cannot be directly obtained from the observation data or the prediction data; estimating a lightning threat on the basis of the observation parameter, the prediction parameter, the case data, and the intermediate parameter; and displaying information regarding the estimated lightning threat.

In the lightning threat information-providing method according to the embodiment of the present invention, the step of estimating a lightning threat may include identifying a lightning weather condition at a predetermined resolution on the basis of the observation parameter, the prediction parameter, the case data, and the intermediate parameter.

In the lightning threat information-providing method according to the embodiment of the present invention, the step of estimating a lightning threat may include estimating a lightning risk including a loss related to quality, cost, and delivery (QCD) due to a lightning strike on the basis of the observation parameter, the prediction parameter, the case data, and the intermediate parameter.

A program according to an embodiment of the present invention causes a computer to execute the steps of: inputting an observation parameter regarding weather observation data, a prediction parameter regarding weather prediction data, and case data regarding a case that occurs in association with lightning occurrence; calculating, on the basis of the input observation parameter and the input prediction parameter, an intermediate parameter which is a parameter regarding physical quantity associated with the lightning occurrence and cannot be directly obtained from the observation data or the prediction data; estimating a lightning threat on the basis of the observation parameter, the prediction parameter, the case data, and the intermediate parameter; and displays information regarding the estimated lightning threat on the display unit.

In the program according to the embodiment of the present invention, the step of estimating a lightning threat may include identifying a lightning weather condition at a predetermined resolution on the basis of the observation parameter, the prediction parameter, the case data, and the intermediate parameter.

In the program according to the embodiment of the present invention, the step of estimating a lightning threat may include estimating a lightning risk including a loss related to quality, cost, and delivery (QCD) due to a lightning strike on the basis of the observation parameter, the prediction parameter, the case data, and the intermediate parameter.

Advantageous Effects of Invention

In accordance with the present invention, accurate information regarding a lightning threat can be provided to a user.

MODE(S) FOR CARRYING OUT THE INVENTION

Hereinafter, an embodiment of the present invention will be described with reference to the drawings.

This embodiment is an example in which a lightning threat information-providing apparatus according to the present invention is applied to a system installed on the ground to cover the airport and its surroundings. It should be noted that the present invention should not be construed as being limited to that embodiment as a matter of course.

[Configuration of Lightning Threat Information-Providing Apparatus]

Figure 1:
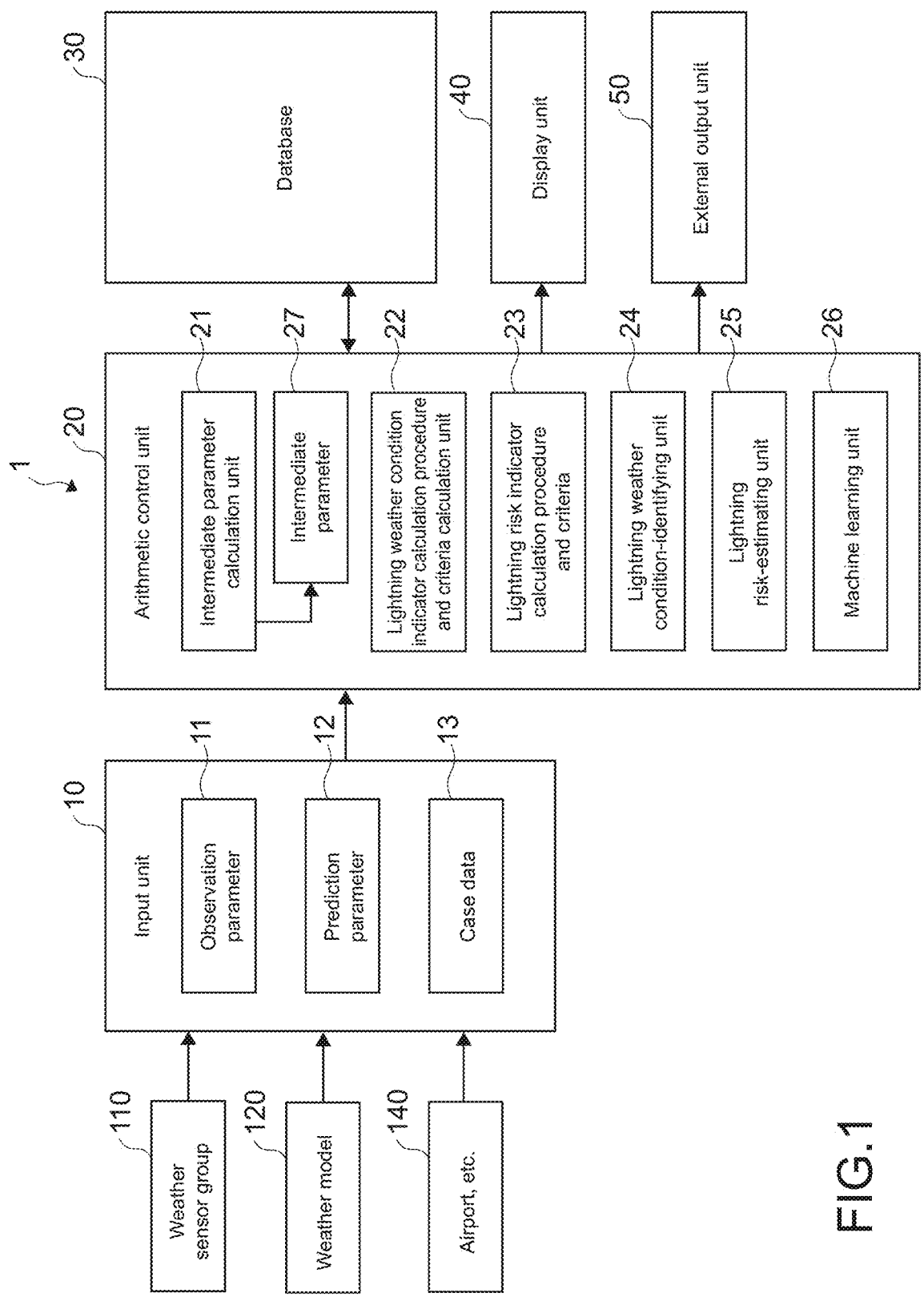
FIG. 1 A block diagram showing a configuration of a lightning threat information-providing apparatus according to an embodiment of the present invention.

FIG. 1 is a block diagram showing a configuration of a lightning threat information-providing apparatus according to an embodiment of the present invention.

The lightning threat information-providing apparatus 1 includes an input unit 10, an arithmetic control unit 20, a database 30, a display unit 40, and an external output unit 50.

Various observation parameters 11, various prediction parameters 12, and various types of case data 13 are input by the input unit 10. The observation parameters 11 are acquired from aircraft or various locations. The prediction parameters 12 are, for example, parameters according to weather prediction data provided from public institutions such as the Meteorological Agency and commercial organizations. The case data 13 is acquired from airports, a data center 140, and the like in respect to an aircraft that, for example, has taken off or landed from or to an airport, typically an aircraft that has landed.

The observation parameters 11 are parameters regarding weather observation data. The observation parameters 11 are parameters obtained from a weather sensor group 110. The observation parameters 11 include typically time-space distributions of echo intensity and Doppler velocity acquired from airport weather radars, altitude distributions of an aircraft location and temperature acquired from a flight data recorder or a radiosonde, and the like.

The prediction parameters 12 are parameters regarding weather prediction data. The prediction parameters 12 are parameters obtained from a weather model 120. The prediction parameters 12 include typically water vapor content at that time or substantially that time. The water vapor content is acquired from the weather model 120.

The case data 13 is data regarding an actual case that occurs in association with lightning occurrence. Typically, an aircraft that approached a radar echo and landed is selected irrespective of the presence/absence of a lightning strike. Then, the case data 13 includes the presence/absence of a lightning strike to the selected aircraft. If the selected aircraft is struck by lightning, the case data 13 includes a lightning strike time, a damage level of the aircraft body, and an influence on the operation due to the lightning strike.

The arithmetic control unit 20 comprehensively controls the entire apparatus. The arithmetic control unit 20 includes an intermediate parameter calculation unit 21, a lightning weather condition indicator calculation procedure and criteria calculation unit 22, a lightning risk indicator calculation procedure and criteria 23, a lightning weather condition-identifying unit 24, a lightning risk-estimating unit 25, and a machine learning unit 26. Regarding a lightning risk, the risk also includes a loss related to quality, cost, and delivery (QCD) due to a lightning strike.

The intermediate parameter calculation unit 21 calculates an intermediate parameter 27. The intermediate parameter 27 is a parameter regarding physical quantity associated with the lightning occurrence. The intermediate parameter 27 is a parameter that cannot be directly obtained from the observation data or the prediction data. The intermediate parameter 27 is typically three-axis wind direction and velocity, turbulence spectrum intensity, short-term prediction results of the echo intensity, and the like.

The three-axis wind direction and velocity are highly accurate wind direction and velocity obtained by integrating radial velocity measured by a weather radar with wind direction and velocity output by a weather model. The weather radar and the weather model are both capable of calculating the wind direction and velocity by itself. The accuracy of both the weather radar and the weather model is insufficient. The three-axis wind direction and velocity are highly accurate. In particular, updraft velocity of the three-axis wind direction and velocity is deeply related to the lightning.

It is considered that the turbulence spectrum intensity is deeply related to an electrical charge distribution. The turbulence spectrum intensity is a value that can be calculated on the basis of such three-axis wind direction and velocity.

The short-term prediction result of the echo intensity is calculated on the basis of the time-space distribution of the echo intensity.

The lightning weather condition indicator calculation procedure and criteria calculation unit 22 automatically learns a calculation procedure of a lightning weather condition identification indicator and a judgement criteria through a calculator or the like on the basis of a relationship between the observation parameters 11, the prediction parameters 12, the intermediate parameter 27, and the case data 13 (presence/absence of a lightning strike) in the past which have been accumulated in the database 30. The calculation procedure of the lightning weather condition identification indicator and the judgement criteria may be arbitrarily set by a designer.

The lightning risk indicator calculation procedure and criteria calculation unit 23 automatically learns a calculation procedure of a lightning risk indicator and a judgement criteria through the calculator or the like on the basis of the relationship between the observation parameters 11, the prediction parameters 12, the intermediate parameter 27, and the case data 13 (presence/absence of the lightning strike and influence on the operation due to the lightning strike) in the past which have been accumulated in the database 30. The calculation procedure of the lightning risk indicator and the judgement criteria may be arbitrarily set by the designer.

Based on the above-mentioned calculation procedure of the lightning weather condition identification indicator and the judgement criteria, the lightning weather condition-identifying unit 24 identifies the lightning weather condition corresponding to the observation parameters 11, the prediction parameters 12, and the intermediate parameter 27, which have been input by the input unit 10 in real time or semi-real time, at a predetermined resolution.

The intermediate parameter 27 set forth herein is a parameter calculated on the basis of the observation parameters 11 and the prediction parameters 12 input by the input unit 10 in real time or semi-real time.

The predetermined resolution is typically a resolution that enables the lightning weather condition (condition under which a lightning strike may occur) to be used for selecting the flight path of the aircraft. Specifically, the resolution is for example a resolution that enables a spatial grid based on 1 km×1 km planes and predetermined heights to cover a space sufficient for representing the lightning weather condition.

Based on the above-mentioned calculation procedure of a lightning risk indicator and a judgement criteria, the lightning risk-estimating unit 25 estimates a lightning risk corresponding to the observation parameters 11 and the prediction parameters 12, which have been input by the input unit 10 in real time or semi-real time, and the intermediate parameter 27.

This intermediate parameter 27 is a parameter calculated on the basis of the observation parameters 11 and the prediction parameters 12 input by the input unit 10 in real time or semi-real time in a manner as described above.

The machine learning unit 26 updates the calculation procedure and the judgement criteria in the lightning weather condition indicator calculation procedure and criteria calculation unit 22 and the lightning risk indicator calculation procedure and criteria calculation unit 23 by machine learning.

The database 30 accumulates the observation parameters 11, the prediction parameters 12, the intermediate parameter 27, and the case data 13 in association with one another. The data stored in the database 30 is for example time series data in which the following items are stored in each column.
  observation parameters 11
    time
    aircraft location
    aircraft measurement temperature
    radar echo-related parameter
  intermediate parameter 27
    wind direction and velocity-related parameter
  prediction parameters 12
    water vapor content-related parameter
  case data 13
    presence/absence of lightning strike
    lightning strike damage level
    degree of influence on operation The display unit 40 displays a result of identification of the lightning weather condition and a result of estimation of the lightning risk on a map.

The external output unit 50 externally outputs the result of identification of the lightning weather condition and the result of estimation of the lightning risk as data which can be displayed on the map. For example, that apparatus may send the output of the external output unit 50 to an aircraft that tries to land to an airport via a transmitter (not shown in the figure) and cause the display unit (not shown in the figure) of the cockpit of the aircraft to display the output. With this configuration, the pilot who manipulates the aircraft can judge a lightning strike risk on the basis of the display and determine whether or not to land to the airport.

[Regarding Technology of Identifying Lightning Weather Condition]

Figure 2:
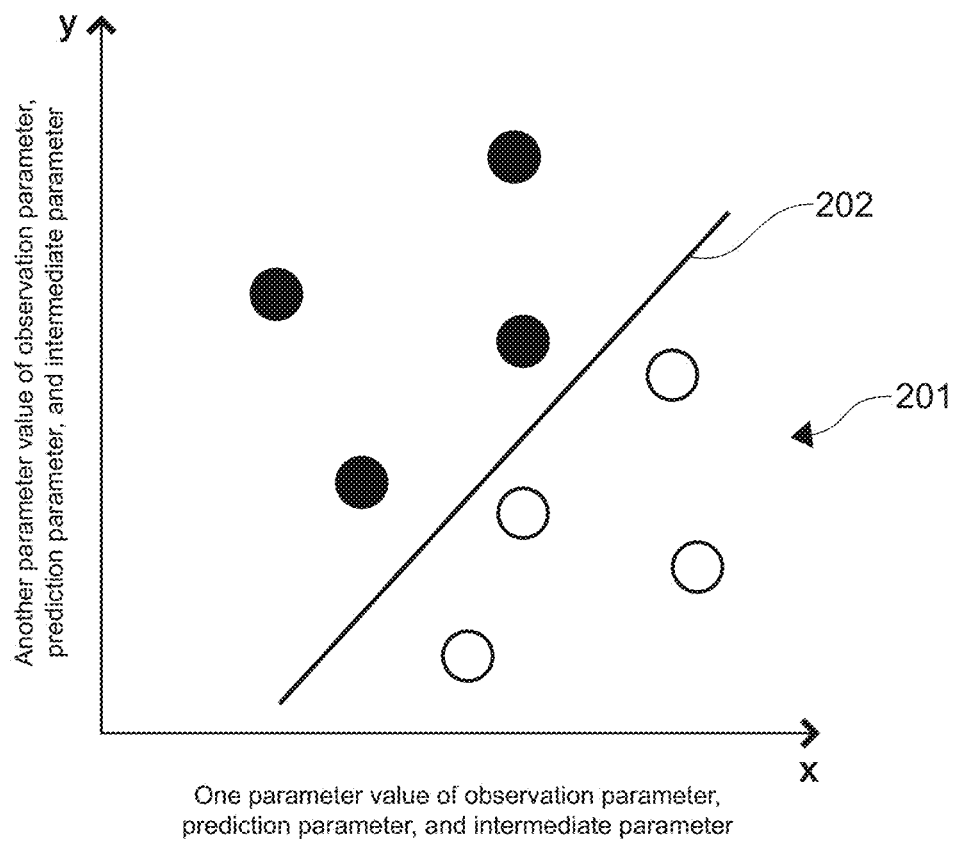
FIG. 2 A diagram for describing a technology of identifying a lightning weather condition according to the embodiment of the present invention.

FIG. 2 is a diagram for describing a technology of identifying the lightning weather condition.

For example, the lightning weather condition indicator calculation procedure and criteria calculation unit 22 calculates the calculation procedure of the lightning weather condition identification indicator and the judgement criteria in a manner as follows conceptually.

Data 201 regarding the observation parameters 11, the prediction parameters 12, and the intermediate parameter 27 of the database 30 is plotted in such a manner that the x-axis of FIG. 2 indicates one parameter value of the observation parameters 11, the prediction parameters 12, and the intermediate parameter 27 and the y-axis indicates another parameter value of the observation parameters 11, the prediction parameters 12, and the intermediate parameter 27.

Along with that, data regarding the presence/absence of a lightning strike is obtained from the case data 13 and the presence/absence of a lightning strike is clearly shown with respect to each point of the plotted data. In FIG. 2, the white circles denote data with no lightning strikes and the black circles denote data with lightning strikes.

In FIG. 2, the line 202 is a judgement criteria of the lightning weather condition identification indicator. This line 202 of the judgement criteria of the lightning weather condition identification indicator is set to divide a data region with no lightning strikes and a data region with lightning strikes from each other. This setting may be automatically learned through the calculator or the like. Alternatively, the designer or the like may arbitrarily set it.

In FIG. 2, the line 202 is the straight line. Alternatively, the line 202 may include a typical curve line and a curve line which cannot be typically considered as being a curve line. The line 202 only needs to be a line with which the data region with no lightning strikes and the data region with lightning strikes can be divided from each other. It should be noted that the data region with no lightning strikes and the data region with lightning strikes cannot be clearly divided with the line in some cases. For example, a part of the data region with no lightning strikes includes the black circle(s) in some cases. In those cases, the black circle(s) contained in such a part can be ignored in drawing the line, for example.

In FIG. 2, the data according to the two parameters is plotted. Otherwise, data on three or more parameters may be plotted, that is, higher-dimensional data may be plotted.

The lightning weather condition-identifying unit 24 determines the position of data in FIG. 2 described above, the data corresponding to the observation parameters 11 and the prediction parameters 12, which have been input by the input unit 10 in real time or semi-real time, and the intermediate parameter 27. Then, the lightning weather condition-identifying unit 24 determines whether that position belongs to the data region with no lightning strikes or the data region with lightning strikes divided with the line 202. With this configuration, the lightning weather condition-identifying unit 24 identifies the lightning weather condition.

As the amount of data accumulated in the database 30 increases, the machine learning unit 26 re-sets (updates) the line 202 by machine learning according to the accumulated data. With this configuration, a more accurate lightning weather condition can be identified.

In the lightning threat information-providing apparatus 1 according to this the embodiment, it can be expected that the number of lightning strike cases during the takeoff/landing phase can be reduced by taking evasive action on the basis of lightning weather condition identification information.

[Regarding Technology of Estimating Lightning Risk]

Figure 3:
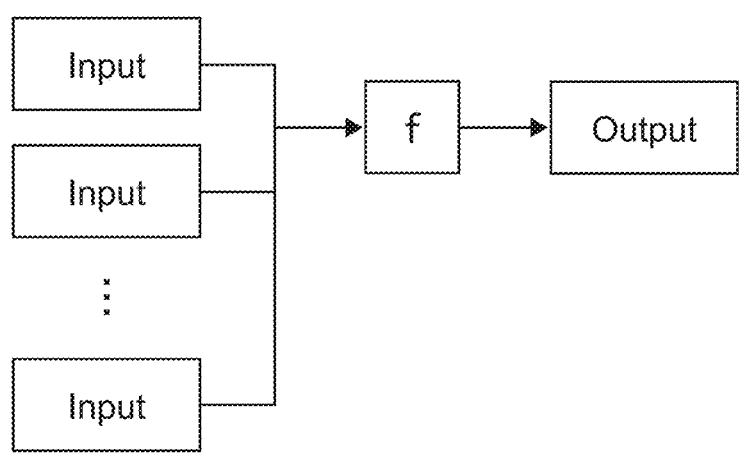
FIG. 3 A diagram for describing a technology of estimating a lightning risk according to the embodiment of the present invention.

FIG. 3 is a diagram for describing a technology of estimating a lightning risk (operation risk).

For example, the lightning risk indicator calculation procedure and criteria calculation unit 23 calculates the calculation procedure of the lightning risk indicator and the judgement criteria in a manner as follows conceptually.

The function $f(x_1, x_2, \ldots, x_n)$ in FIG. 3 is set on the basis of the observation parameters 11, the prediction parameters 12, the intermediate parameter 27, and the case data 13 accumulated in the database 30. This setting may be automatically learned through the calculator or the like. Alternatively, the designer or the like may arbitrarily set it.

An aircraft that approached a radar echo and landed is selected irrespective of the presence/absence of a lightning strike. Then, the case data 13 includes the presence/absence of a lightning strike to the selected aircraft. If the selected aircraft is struck by lightning, the case data 13 includes a lightning strike time, a damage level of the aircraft body, and an influence on the operation due to the lightning strike, and the like. The case data 13 includes an economical loss due to the lightning strike.

The lightning risk is for example an indicator estimated on the basis of the probability at which an aircraft can be struck by lightning when the aircraft currently tries to land, an operation delay time and an aircraft body damage level if the aircraft is struck by lightning, and a degree of influence on the operation which is related to the cost and the like required for recovery. For example, regarding the lightning risk, the risk level is shown as "low", "middle", or "high" stepwisely in a manner that depends on the risk level.

The function $f(x_1, x_2, \ldots, x_n)$ is a function for estimating such a level in accordance with the observation parameters 11 and the prediction parameters 12, which have been input by the input unit 10 in real time or semi-real time, and the intermediate parameter 27. Here, n is the number of input parameters, for example.

When the observation parameters 11 and the prediction parameters 12, which have been input by the input unit 10 in real time or semi-real time, and the intermediate parameter 27 are input in $f(x_1, x_2, \ldots, x_n)$, the risk level such as "low", "middle", and "high" is output from $f(x_1, x_2, \ldots, x_n)$.

The function $f(x_1, x_2, \ldots, x_n)$ is a linear function like y=a1x1+a2x2+ . . . +anxn, for example. The function (a1, a2, . . . , an) is determined on the basis of sets of (y, x1, x2, . . . , xn) which are associated in the database 30 and are present for each case. In this case, in general, n-number of sets of (y, x1, x2, . . . , xn) or more are necessary and (a1, a2, . . . , an) can be determined by the least-squares method or the like.

As the amount of data accumulated in the database 30 increases, the machine learning unit 26 re-sets $f(x_1, x_2, \ldots, x_n)$ by machine learning according to the accumulated data. With this configuration, a more accurate lightning risk can be estimated.

For example, the machine learning unit 26 can be configured by a neural network. The neural network is configured by combining the above-mentioned linear functions in a plurality of layers, for example. For example, Document by C. M. Bishop "Pattern Recognition and Machine Learning, Springer, 2006" has disclosed the details. In the present invention, deep machine learning may be performed by setting a large number of such layers.

As for the Japanese domestic aircraft flights, several hundreds of lightning strikes per year occurs. There is an extremely low possibility that the lightning strike to the aircraft directly leads to a critical accident. However, it is estimated that it takes about several million yen per year as the cost for repairing due to damages caused in the plating and the like of aircraft bodies. That is the cost only for small repairing. Taking the permanent repair into account, the cost increases greatly. Further, it takes no small time to conduct inspection and temporary measures of the aircraft body struck by lightning. Therefore, even in a case of a small scale damage, it may often lead to delay of a next flight as a matter of course. In a case of a large scale damage, it may lead to flight cancel, which greatly affects operation schedules. In addition, in Japan, high energy lightning called winter lightning occurs in the Japan Sea coastal area in winter. That is a factor of concern for airlines for long years.

In the lightning threat information-providing apparatus 1 according to this the embodiment, assessment is performed on the basis of not only the indicator according to the weather physical quantity like the lightning weather condition but also the indicator regarding the lightning risk, in other words, the operation risk and the resulting information is provided. It is thus possible to take evasive action without an operator having specialized knowledge, for example. In addition, it is possible to carry out risk management to the lightning damage.

[Flow of Determination of Calculation Procedure of Indicator Regarding Lightning Weather Condition and Lightning Risk and Criteria]

Figure 4:
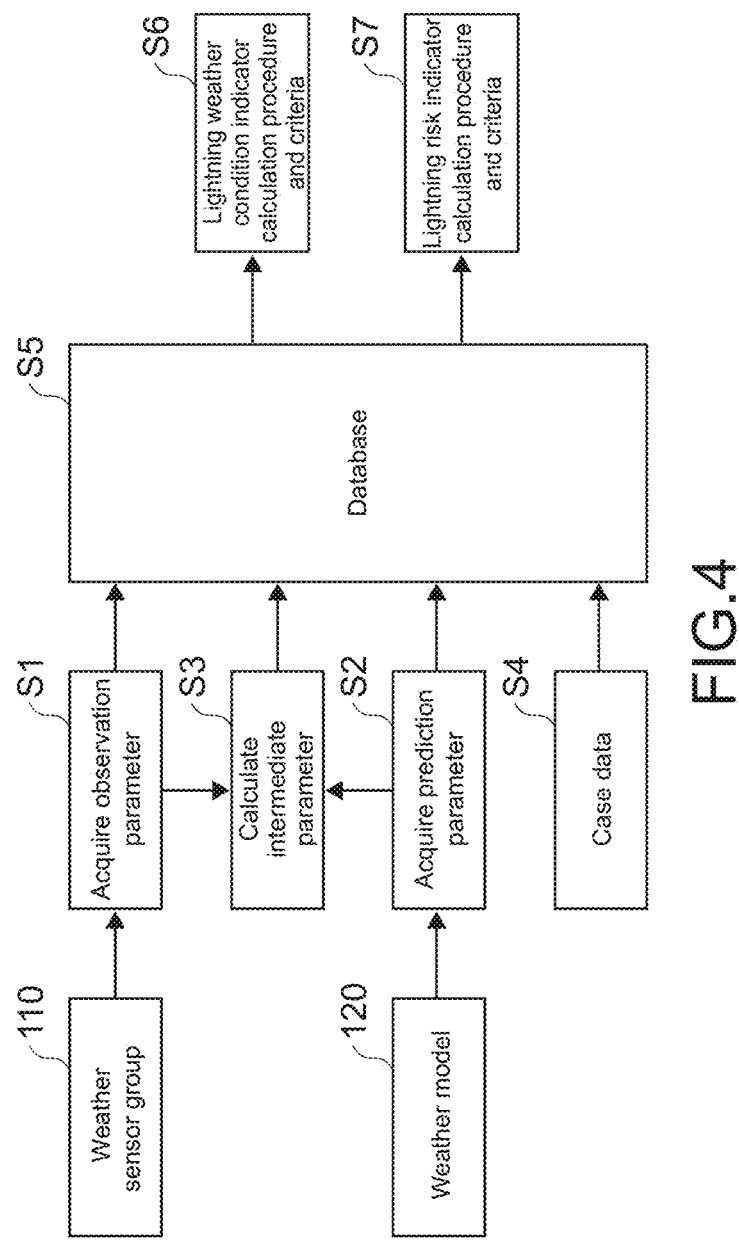
FIG. 4 A block diagram for describing a flow of determination of a calculation procedure of an indicator and a criteria regarding the lightning weather condition and the lightning risk according to the embodiment of the present invention.

FIG. 4 is a block diagram for describing a flow of determination of the calculation procedure of the indicator and the criteria.

(1) Generation and Retaining of Database 30 Regarding Lightning Strike to Aircraft The arithmetic control unit 20 acquires the observation parameters 11 on the basis of the weather sensor group 110 via the input unit 10 (S1).

The arithmetic control unit 20 acquires the prediction parameters 12 on the basis of the weather model 120 via the input unit 10 (S2).

The arithmetic control unit 20 calculates the intermediate parameter 27 on the basis of the observation parameters 11 and the prediction parameters 12 (S3).

The arithmetic control unit 20 acquires the case data 13 (S4).

The arithmetic control unit 20 accumulates those parameters 11, 12, and 27 and the case data 13 in the database 30 regarding the lightning strike to the aircraft in association with each other (S5).

(2) Determination of Calculation Procedure of Lightning Weather Condition Indicator and Judgement Criteria The arithmetic control unit 20 automatically learns the calculation procedure of the lightning weather condition identification indicator and the judgement criteria through the calculator or the like on the basis of a relationship between the above-mentioned input data and the case data (presence/absence of a lightning strike) (S6).

(3) Determination of Calculation Procedure of Lightning Risk Indicator and Judgement Criteria The arithmetic control unit 20 automatically learns the calculation procedure of the lightning risk indicator and the judgement criteria through the calculator or the like on the basis of a relationship between the above-mentioned input data and the case data (presence/absence of the lightning strike, influence on the operation due to the lightning strike, and the like) (S7).

(4) Machine Learning

The arithmetic control unit 20 adds the newly collected case data 13 and performs S1 to S7 for enhancing the accuracy.

[Flow During Operation of Lightning Threat Information-Providing Apparatus 1]

Figure 5:
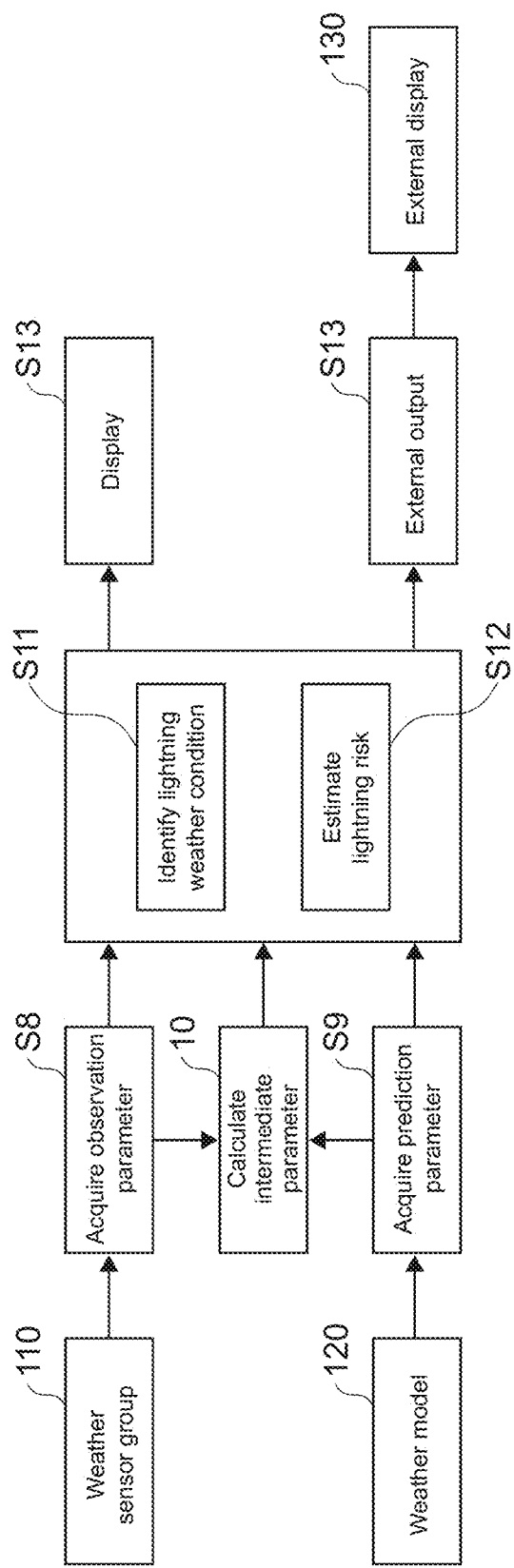
FIG. 5 A block diagram for describing a flow during operation of the lightning threat information-providing apparatus according to the embodiment of the present invention.

FIG. 5 is a block diagram for describing a flow during operation of the lightning threat information-providing apparatus 1.

(1) Acquisition of Observation Parameters

The arithmetic control unit 20 acquires the observation parameters 11 via the input unit 10 from the weather sensor group 110 in real time (S8).

(2) Acquisition of Prediction Parameters

The arithmetic control unit 20 acquires the prediction parameters 12 via the input unit 10 from the weather model 120 (S9).

(3) Calculation of Intermediate Parameter

The arithmetic control unit 20 calculates the intermediate parameter 27 on the basis of the observation parameters 11 and the prediction parameters 12 in real time (S10).

(4) Identification of Lightning Weather Condition

The arithmetic control unit 20 uses the above-mentioned three types of parameters 11, 12, and 27 acquired in real time as inputs and identifies the lightning weather condition in accordance with the calculation procedure and judgement criteria determined at S6 (S11).

(5) Lightning Risk Estimation

The arithmetic control unit 20 uses the above-mentioned three types of parameters 11, 12, and 27 acquired in real time as inputs and estimates the lightning risk in accordance with the calculation procedure and judgement criteria determined at S7 (S12).

(6) Display

The arithmetic control unit 20 causes a display that is an accessory of the display unit 40 or an external display 130 via the external output unit 50 to display a result of lightning weather condition identification or a result of lightning risk estimation on the map (S13).

[Others]

The present invention is not limited to the above-mentioned embodiment and various modifications and applications can be made.

For example, the present invention can be applied to an unmanned aircraft operation. For the unmanned aircraft operation, no rules exist currently. However, if unmanned aircraft become popular, a more safety operation becomes necessary. The safety can be enhanced by applying the present invention to that operation.

Further, the present invention can also be applied to natural lightning. An improvement in the economy and the safety can be achieved by applying the present invention especially for judgement as to operation suspension in a factory where a power failure due to a lightning leads to a great economic disadvantage, a factory where hazardous substances, chemicals, and the like can leak out due to a power failure due to lightning, or the like.

Regarding the above-mentioned embodiment, the present invention further discloses the following method and program.

(1) A lightning threat information-providing method, including:

inputting an observation parameter regarding weather observation data, a prediction parameter regarding weather prediction data, and case data regarding a case that occurs in association with lightning occurrence;

calculating, on the basis of the input observation parameter and the input prediction parameter, an intermediate parameter which is a parameter regarding physical quantity associated with the lightning occurrence and cannot be directly obtained from the observation data or the prediction data;

estimating a lightning threat on the basis of the observation parameter, the prediction parameter, the case data, and the intermediate parameter; and displaying information regarding the estimated lightning threat.

(2) The lightning threat information-providing method according to (1), in which the step of estimating a lightning threat includes identifying a lightning weather condition at a predetermined resolution on the basis of the observation parameter, the prediction parameter, the case data, and the intermediate parameter.

(3) The lightning threat information-providing method according to (1) or (2), in which the step of estimating a lightning threat includes estimating a lightning risk including a loss related to quality, cost, and delivery (QCD) due to a lightning strike on the basis of the observation parameter, the prediction parameter, the case data, and the intermediate parameter.

(4) The lightning threat information-providing method according to (1), (2), or (3), further comprising:

accumulating the observation parameter, the prediction parameter, the intermediate parameter, and the case data in a database in association with one another;

inputting the observation parameter and the prediction parameter acquired in real time or semi-real time;

calculating the intermediate parameter on the basis of the observation parameter and the prediction parameter acquired in real time or semi-real time; and estimating, on the basis of the observation parameter, the prediction parameter, the intermediate parameter, and the case data accumulated in the database, a lightning threat corresponding to the observation parameter, the prediction parameter, and the intermediate parameter, the observation parameter and the prediction parameter being acquired in real time or semi-real time.

(5) The lightning threat information-providing method according to (2), further comprising determining and updating a calculation procedure and a judgement criteria of condition identification by machine learning.

(6) The lightning threat information-providing method according to (3), further comprising determining and updating a calculation procedure and a judgement criteria of risk estimation by machine learning.

(7) A program that causes a computer to execute the steps of:

inputting an observation parameter regarding weather observation data, a prediction parameter regarding weather prediction data, and case data regarding a case that occurs in association with lightning occurrence;

calculating, on the basis of the input observation parameter and the input prediction parameter, an intermediate parameter which is a parameter regarding physical quantity associated with the lightning occurrence and cannot be directly obtained from the observation data or the prediction data;

estimating a lightning threat on the basis of the observation parameter, the prediction parameter, the case data, and the intermediate parameter; and displays information regarding the estimated lightning threat on the display unit.

(8) The program according to (7), in which the step of estimating a lightning threat includes identifying a lightning weather condition at a predetermined resolution on the basis of the observation parameter, the prediction parameter, the case data, and the intermediate parameter.

(9) The program according to (7) or (8), in which the step of estimating a lightning threat includes estimating a lightning risk including a loss related to quality, cost, and delivery (QCD) due to a lightning strike on the basis of the observation parameter, the prediction parameter, the case data, and the intermediate parameter.

(10) The program according to (7), (8), or (9) that causes the computer to further execute the steps of:

accumulating the observation parameter, the prediction parameter, the intermediate parameter, and the case data in a database in association with one another;

inputting the observation parameter and the prediction parameter acquired in real time or semi-real time;

calculating the intermediate parameter on the basis of the observation parameter and the prediction parameter acquired in real time or semi-real time; and estimating, on the basis of the observation parameter, the prediction parameter, the intermediate parameter, and the case data accumulated in the database, a lightning threat corresponding to the observation parameter, the prediction parameter, and the intermediate parameter, the observation parameter and the prediction parameter being acquired in real time or semi-real time.

(11) The program according to (8) that causes the computer to further execute the step of determining and updating a calculation procedure and a judgement criteria of condition identification by machine learning.

(12) The program according to (9) that causes the computer to further execute the step of
determining and updating a calculation procedure and a judgement criteria of risk estimation by machine learning.

REFERENCE SIGNS LIST 1 lightning threat information-providing apparatus
10 input unit
11 observation parameter
12 prediction parameter
13 case data
20 arithmetic control unit
21 intermediate parameter calculation unit
24 lightning weather condition-identifying unit
25 lightning risk-estimating unit
26 machine learning unit
27 intermediate parameter
30 database
40 display unit

The invention claimed is:

1. A lightning threat information-providing apparatus, comprising:
an input device of a computer that inputs an observation parameter regarding weather observation data including first observation data collected at an aircraft and second observation data collected from ground sensors, and a prediction parameter regarding weather prediction data;
a processor of the computer that calculates an intermediate parameter regarding a physical quantity associated with a lightning occurrence including a lightning strike to the aircraft and is obtained from the input observation parameter and the prediction parameter; and
an output unit located either in the aircraft or in a system installed on the ground, and
wherein the processor further:
divides a multi-dimensional data group of case data of actual past lightning occurrence into a first data group with no lightning strikes to any aircraft and a second data group with lightning strikes to bodies of aircraft, wherein each data of the second data group includes a lightning strike time, a damage level of the respective bodies of aircraft, and an influence on operation of the respective bodies of aircraft due to the respective lightning strikes;
identifies a lightning weather condition corresponding to the observation parameter, the prediction parameter, and the intermediate parameter acquired in real time or semi-real time from the input device at a first resolution;
selects a flight path of the aircraft during takeoff/landing phases on a basis of the lightning weather condition in consideration of a judgment criterion based on the first data group and the second data group;
provides information regarding the lightning weather condition at the first resolution for the aircraft and information regarding the flight path for the aircraft, which is concurrently attempting to take off or land; and
transmits the information regarding the lightning weather condition at the first resolution and the information regarding the flight path to the aircraft for display via the output unit located in the aircraft or to the output unit located in the system installed on the ground.

2. The lightning threat information-providing apparatus according to claim 1, wherein the processor identifies a lightning weather condition at a predetermined resolution on a basis of the observation parameter, the prediction parameter, and the intermediate parameter.

3. The lightning threat information-providing apparatus according to claim 2, wherein the processor further estimates a lightning risk including a loss related to quality, cost, and delivery (QCD) due to a lightning strike on a basis of the observation parameter, the prediction parameter, the case data, and the intermediate parameter.

4. The lightning threat information-providing apparatus according to claim 3, further comprising a database that accumulates the observation parameter, the prediction parameter, and the intermediate parameter in association with one another,
wherein the input device inputs the observation parameter and the prediction parameter acquired in real time or semi-real time, and
wherein the processor calculates the intermediate parameter on a basis of the observation parameter and the prediction parameter acquired in real time or semi-real time.

5. The lightning threat information-providing apparatus according to claim 2, further comprising a database that accumulates the observation parameter, the prediction parameter, and the intermediate parameter in association with one another,
wherein the input device inputs the observation parameter and the prediction parameter acquired in real time or semi-real time, and
wherein the processor calculates the intermediate parameter on a basis of the observation parameter and the prediction parameter acquired in real time or semi-real time.

6. The lightning threat information-providing apparatus according to claim 1, wherein the processor further estimates a lightning risk including a loss related to quality, cost, and delivery (QCD) due to a lightning strike on a basis of the observation parameter, the prediction parameter, and the intermediate parameter.

7. The lightning threat information-providing apparatus according to claim 6, wherein a calculation procedure and a judgment criteria of risk estimation of the processor are determined and updated by machine learning.

8. The lightning threat information-providing apparatus according to claim 6, further comprising a database that accumulates the observation parameter, the prediction parameter, and the intermediate parameter in association with one another,
wherein the input device inputs the observation parameter and the prediction parameter acquired in real time or semi-real time, and
the processor calculates the intermediate parameter on a basis of the observation parameter and the prediction parameter acquired in real time or semi-real time.

9. The lightning threat information-providing apparatus according to claim 1, further comprising a database that accumulates the observation parameter, the prediction parameter, and the intermediate parameter in association with one another,
wherein the input device inputs the observation parameter and the prediction parameter acquired in real time or semi-real time, and wherein the processor calculates the intermediate parameter on a basis of the observation parameter and the prediction parameter acquired in real time or semi-real time.

10. The lightning threat information-providing apparatus according to claim 1, wherein a calculation procedure and a judgment criteria of condition identification of the processor are determined and updated by machine learning.

11. A lightning threat information-providing method, comprising:
inputting an observation parameter regarding weather observation data including first observation data collected at an aircraft and second observation data collected from ground sensors, and a prediction parameter regarding weather prediction data;
calculating an intermediate parameter regarding a physical quantity associated with a lightning occurrence including a lightning strike to the aircraft obtained from the input observation parameter and the prediction parameter;
dividing a multi-dimensional data group of case data of actual past lightning occurrence into a first data group with no lightning strikes to any aircraft and a second data group with lightning strikes to bodies of aircraft, wherein each data of the second data group includes a lightning strike time, a damage level of the respective bodies of aircraft, and an influence on operation of the respective bodies of aircraft due to the respective lightning strikes;
identifying a lightning weather condition corresponding to the observation parameter, the prediction parameter, and the intermediate parameter acquired in real time or semi-real time at a first resolution;
selecting a flight path of the aircraft during takeoff/landing phases on a basis of the lightning weather condition in consideration of a judgment criterion based on the first data group and the second data group;
displaying information regarding the lightning weather condition;
providing information regarding the lightning weather condition at the first resolution and information regarding the flight path to the aircraft that is concurrently attempting to take off or land; and
transmitting the information regarding the lightning weather condition at the first resolution and the information regarding the flight path to the aircraft for display via an output unit located in the aircraft or to an output unit located in a system installed on the ground.

12. The lightning threat information-providing method according to claim 11, wherein the lightning weather condition is identified at a predetermined resolution on a basis of the observation parameter, the prediction parameter, and the intermediate parameter.

13. The lightning threat information-providing method according to claim 12, further comprising estimating a lightning risk including a loss related to quality, cost, and delivery (QCD) due to a lightning strike on a basis of the observation parameter, the prediction parameter, the case data, and the intermediate parameter.

14. The lightning threat information-providing method according to claim 11, further comprising estimating a lightning risk including a loss related to quality, cost, and delivery (QCD) due to a lightning strike on a basis of the observation parameter, the prediction parameter, and the intermediate parameter.

15. A non-transitory computer readable medium comprising a program that causes a computer to execute the steps of:
inputting an observation parameter regarding weather observation data including first observation data collected at an aircraft and second observation data collected from ground sensors, and a prediction parameter regarding weather prediction data;
calculating an intermediate parameter regarding a physical quantity associated with a lightning occurrence including a lightning strike to the aircraft obtained from the input observation parameter and the prediction parameter;
dividing a multi-dimensional data group of case data of actual past lightning occurrence into a first data group with no lightning strikes to any aircraft and a second data group with lightning strikes to bodies of aircraft, wherein each data of the second data group includes a lightning strike time, a damage level of the respective bodies of aircraft, and an influence on operation of the respective bodies of aircraft due to the respective lightning strikes;
identifying a lightning weather condition corresponding to the observation parameter, the prediction parameter, and the intermediate parameter acquired in real time or semi-real time at a first resolution;
selecting a flight path of the aircraft during takeoff/landing phases on a basis of the lightning weather condition in consideration of a judgment criterion based on the first data group and the second data group;
displaying information regarding the lightning weather condition on a display unit;
providing the information regarding the lightning weather condition at the first resolution and information regarding the flight path to the aircraft that is concurrently attempting to take off or land; and
transmitting the information regarding the lightning weather condition at the first resolution and the information regarding the flight path to the aircraft for display via an output unit located in the aircraft or to the output unit located in a system installed on the ground.

16. The non-transitory computer readable medium according to claim 15, wherein the lightning weather condition is identified at a predetermined resolution on a basis of the observation parameter, the prediction parameter, and the intermediate parameter.

17. The non-transitory computer readable medium according to claim 16, wherein the program further causes the computer to execute the step of estimating a lightning risk including a loss related to quality, cost, and delivery (QCD) due to a lightning strike on a basis of the observation parameter, the prediction parameter, the case data, and the intermediate parameter.

18. The non-transitory computer readable medium according to claim 15, wherein the program further causes the computer to execute the step of estimating a lightning risk including a loss related to quality, cost, and delivery (QCD) due to a lightning strike on a basis of the observation parameter, the prediction parameter, the case data, and the intermediate parameter.

* * * * *